T. H. JACOB.
MEANS FOR CONNECTING AND STEERING A SERIES OF SELF PROPELLED VEHICLES.
APPLICATION FILED JUNE 8, 1917.
1,261,237.
Patented Apr. 2, 1918.
2 SHEETS—SHEET 1.
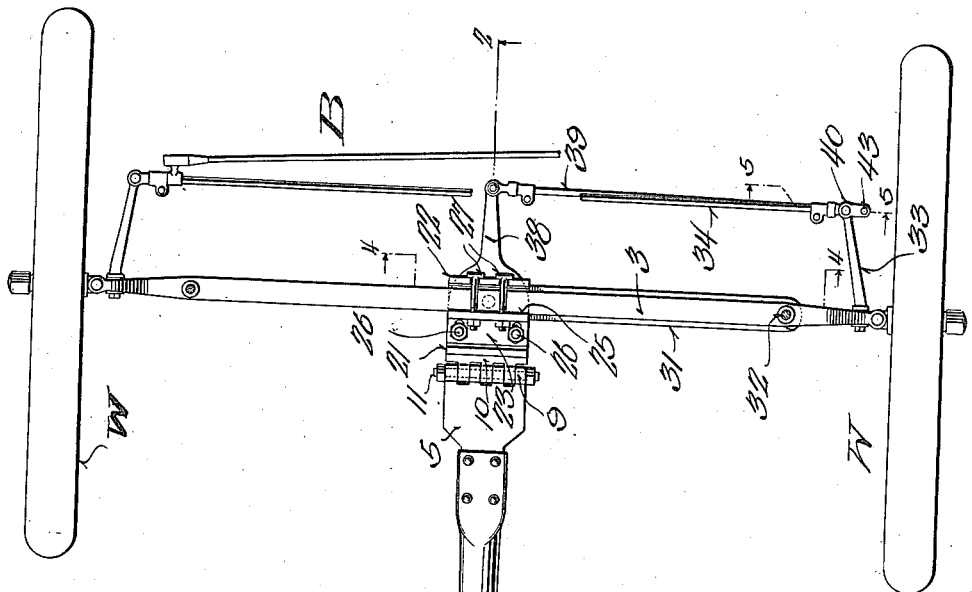
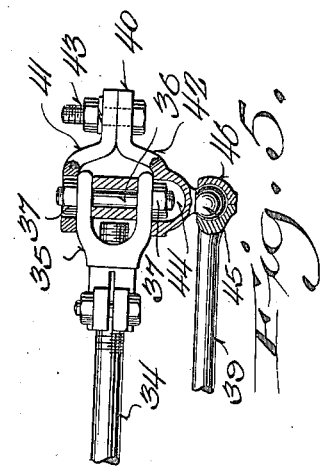
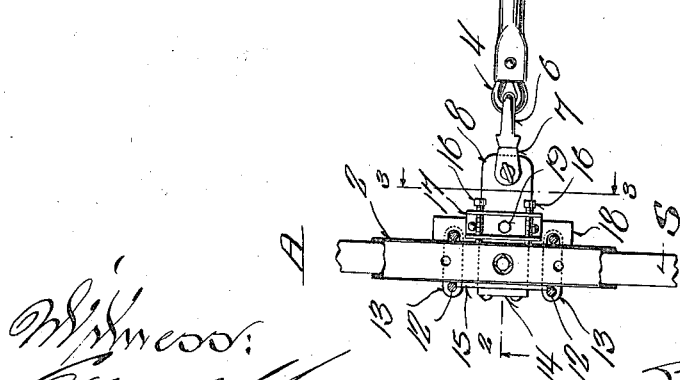

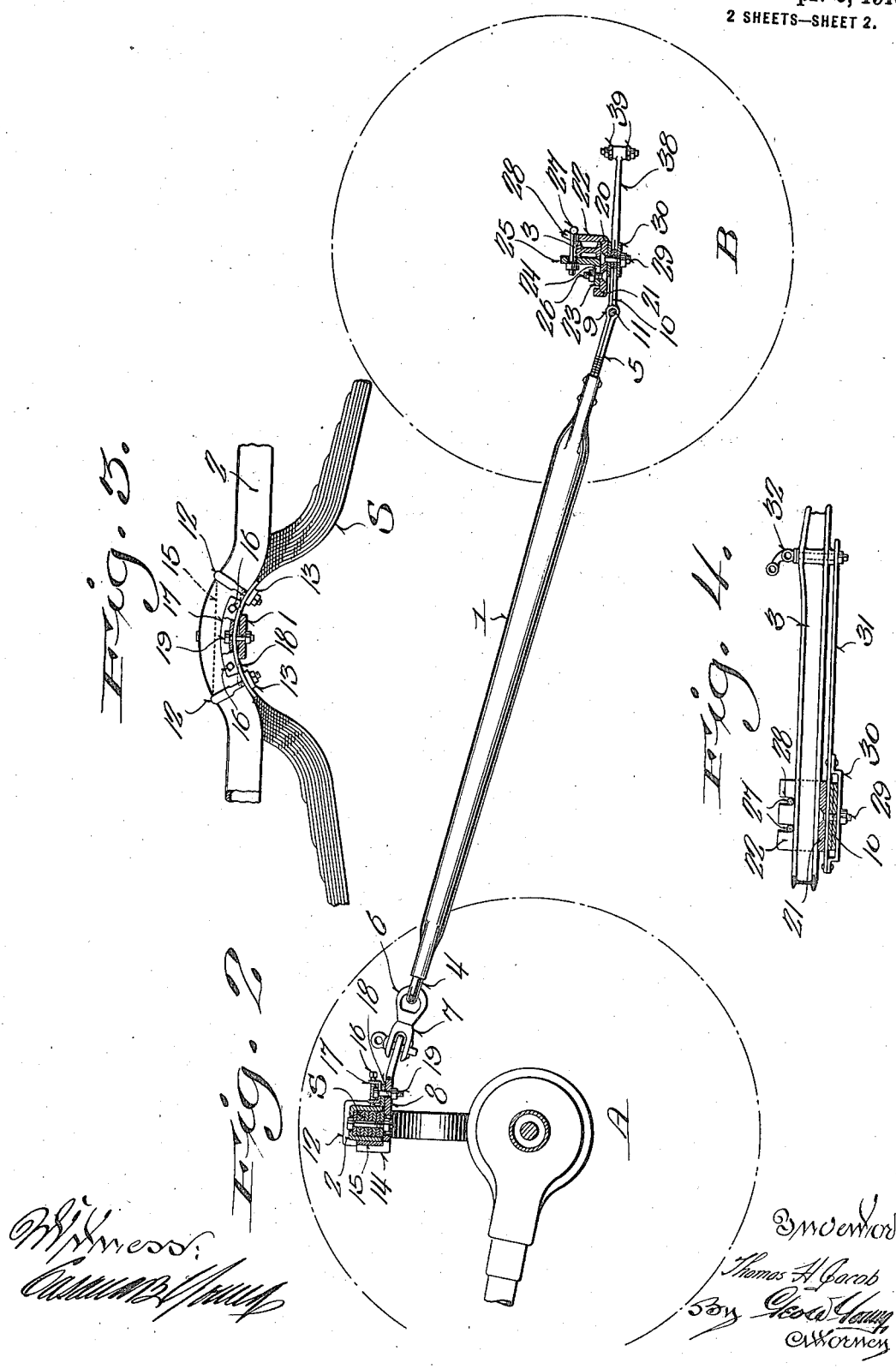

UNITED STATES PATENT OFFICE.

THOMAS H. JACOB, OF WAUSAU, WISCONSIN.

MEANS FOR CONNECTING AND STEERING A SERIES OF SELF-PROPELLED VEHICLES.

1,261,237.

Specification of Letters Patent.

Patented Apr. 2, 1918.

Application filed June 8, 1917. Serial No. 173,499.

*To all whom it may concern:*

Be it known that I, THOMAS H. JACOB, a citizen of the United States, and resident of Wausau, in the county of Marathon and State of Wisconsin, have invented certain new and useful Improvements in Means for Connecting and Steering a Series of Self-Propelled Vehicles; and I do hereby declare that the following is a full, clear, and exact description thereof.

My invention relates to new and useful improvements in means for coupling a plurality of automobiles and similar vehicles together for the purpose of transportation and in an arrangement of parts for transmitting a change in the direction of travel of the foremost vehicle to those following.

Under present conditions it is usually necessary to move a plurality of self-propelled vehicles individually, each in charge of a separate operator, when it is desired to convey the same from the factory or other places to a more or less remote point. This condition usually arises where a shipping point is a considerable distance from the factory wherein the vehicles are manufactured, or when it is necessary to convey the machines from railway cars on which they have been sent from their factory to the sales rooms or ware-house where they are to be disposed until sold. It is obvious that the necessity for a considerable number of drivers when the consignment of vehicles is very large is very expensive, and if the whole number of machines could be placed in charge of one operator, this transportation cost would be very materially lessened.

To overcome this difficulty the present invention has been perfected, and by the use of the same a great number of vehicles may be coupled together end to end and caused to simultaneously move as one unit.

In connection with the main object of coupling a plurality of vehicles together, the invention also resides in an improved arrangement for transmitting any change of direction from the foremost vehicle, which is in charge of an operator, to the several machines following. Thus the whole line of vehicles can be steered from the foremost vehicle and caused to move in any direction in unison therewith.

Minor objects of this invention relate to improved means for attaching the coupling members and steering mechanism to the most convenient parts of the different vehicles. Such attaching means of the coupling members are constructed so that they may be readily adjusted and quickly attached or detached to and from the vehicles without changing any of the parts thereof.

With these and other objects in view the invention resides in the novel features of construction, combination and arrangement of parts which will be hereinafter more particularly described, claimed and shown in the drawings, wherein:

Figure 1 represents a plan view of portions of certain parts of a pair of vehicles which are coupled together by my improved connecting means.

Fig. 2 is a vertical longitudinal section on the plane of the line 2—2 of Fig. 1.

Fig. 3 is a detail transverse section on the line 3—3 of Fig. 1.

Fig. 4 is a similar view on the plane of the line 4—4 of Fig. 1, and

Fig. 5 is a detail transverse longitudinal section on an enlarged scale, said section being taken on the line 5—5 of Fig. 1.

In the present application the front and rear ends of a pair of vehicles of well known construction are shown, and the parts in the invention have been fashioned for use in connection therewith. It is obvious, however, that my invention contemplates various changes to permit its use with vehicles of various makes.

The foremost of the pair of vehicles which are indicated generally in Figs. 1 and 2 is designated by the letter A, and has a coupler bar 1 forming part of the invention attached to the rear channeled metal bar 2 of the vehicle frame, whereas the rear end of said bar 1 is secured to the front axle 3 of the rearmost vehicle B. Both of these vehicles are of the self-propelled or automobile type in which the steering mechanism is controlled by a suitable steering wheel and post from the driver's seat. The coupler bar 1 is preferably tubular and has an eye 4 secured to its forward end and a plate 5 fixed to its rear end, said eye receiving an eye 6 of a swiveled link 7 which detachably secures the bar 1 to the draw bar 8 forming part of the attaching means for the forward end of the coupling bar. This connection between the draw bar 8 and the eye 4 provides in effect a universal joint. The free end of the plate 5 is formed into a plurality of hinge knuckles 9 which coöperate with similar knuckles 9 on a rear draw bar or plate 10 to which it is hinged by a pintle 11 extending through said knuckles. The rear draw bar 10 is attached to the securing means which connects the rear end of the coupler bar 1 to the axle 3 as will be hereinafter more particularly set forth.

The rear frame bar 2 of the foremost vehicle is disposed with its channel downwardly to receive an upwardly bowed portion of a transverse spring S, said bar also being slightly bowed to accommodate the similar portion of the spring. To hold these two parts together a pair of spring clips and spring clip bars 12 and 13 respectively are used, said clips being spaced apart and downwardly and inwardly inclined toward each other because of the bow in the frame bar 2 and spring S. This positioning of the clips 12 is taken advantage of to secure the hereinbefore mentioned attaching means for the forward end of the coupler bar to the frame bar 2. That is to say, the draw bar 8 has its front end, or the end remote from its point of adjustment to the link 7 upturned as at 14 to procure a flange to which a plate 15 may be rigidly attached, said plate having its opposite ends downwardly and inwardly beveled off for engagement with the clips 12 and inner or forward side of the bar 2 against which it is tightly drawn by a pair of set bolts 16.

The bolts 16 are threadedly positioned in upright flanges of a channeled metal plate 17 secured to a notched plate 18 that is pivotally connected intermediate its ends as at 19 to the draw bar 8 on the opposite side of the frame bar 2 from the plate 15. This plate 18 is considerably longer than the distance between the spring clips 12 and has its inner edge notched to receive said spring clips as clearly shown in Fig. 1 to aid the plate 15 in retaining the draw bar 8 in engagement with the frame bar 2. It will also be noted that this plate 18 rests upon the clip bars 13.

By such an arrangement the forward end of the coupling bar 1 may be very quickly and securely attached to the frame bar 2 when necessary. In assembling this forward attaching means the draft bar 8 is disposed beneath the bowed portion of the spring S and frame bar 2 and moved until the plate 15 engages the spring clips 12. Such positioning of the plate 15 also causes the plate 18 to be engaged with the spring clips on the opposite side of the frame bar 2 as above mentioned. Then upon tightening of the set bolts 16 these plates are forced tightly into engagement with the parts with which they are to be secured.

The attaching means for the rear end of the coupling bar 1 comprises a rightangular plate 20 having its horizontal arm 21 engaged with the under side of the axle 3 and its vertical arm 22 disposed against the inner side of said axle, and an L-shaped plate whose horizontal arm 23 is slotted as at 24 and adapted to slide on the arm 21 of the plate 20 to move its vertical arm 25 into or out of engagement with the front side of the axle 3. The slots 24 receive upwardly extending threaded studs 26 upon which nuts are disposed, which when tightened, force the horizontal arms of the two plates together.

In applying this attaching means to the axle 3 the nuts on the studs are loosened and the plates slipped upon the axle from the under side thereof, and after said nuts are tightened, a pair or more of T bolts 27 loosely carried by the arm 25 are slipped over the top of the axle 3. The T heads of these bolts 27 are engaged with the arm 22 of the plate 20 as in Fig. 2, their shanks having been dropped into kerfs 28 in the upper edge thereof. Upon tightening the nuts on these bolts 27 the vertical arms 22 and 25 of the two plates will be moved toward each other to clamp the axle 3 therebetween.

The draw bar or plate 10 which is hinged to the end 5 of the coupler bar is pivoted at 29 to the horizontal arm 21 of the plate 20 and to a U-shaped yoke 30 carried thereby. Said plate 10 is disposed between said yoke 30 and an elongated bar 31, as shown in Fig. 4. This bar 31 is designed to position the device mid-way the ends of the axle 3 and to hold the same against longitudinal shifting thereon. To accomplish which purpose the free end of the bar 31 is secured to the lower end of one of the usual spring perches 32 at one end of the axle 3. By this arrangement a pair or more of motor vehicles may be coupled together very quickly and easily.

In order to cause the entire line of connected vehicles to move in unison upon any change of direction of movement of the foremost vehicle, additional means is provided for use in connection with the coupling arrangement just described. This means is adapted to coöperate with the usual steering mechanism at the front end of each of the vehicles which includes the spindle arms 33, the spindle connecting rod 34 and the spindle connecting rod yokes 35 which straddle the ends of the spindle arms and are pivoted thereto by bolts 36, said bolts having nuts 37 on their opposite ends and upon the outer sides of the arms of the yokes 35, as is apparent in the detail view, Fig. 5. This ordinary construction is not changed in the slightest upon the application of parts which form my invention, the latter being only temporarily attachable for use during the transportation of the plurality of vehicles.

This steering attachment of my invention consists of an arm 38 which projects rearwardly from the draw bar 10 and a connecting rod 39 pivoted at one end thereto, its opposite end being universally connected to one of the spindle arms 33. So that it may be readily disconnected a two-part separable yoke 40 is used, the parts 41 and 42 of the same being held together by a bolt and nut 43. The section 41 of the yoke 40 is provided with an opening to receive the uppermost nut 37, while the other section 42 has a socket 44 for the reception of the lowermost nut 37. Said socket 24 has a ball 45 depending therefrom and disposed in a cup 46 on the end of the connecting rod 39 to thereby procure a universal joint.

It is obvious that upon movement of the vehicle A out of line of travel upon which the rear vehicles are moving, the coupler bar 1 will be disposed at an angle to the axle 3 of the vehicle B and thereby shift the arm 38 toward one side or the other of said vehicle B. It is obvious that such movement will be transmitted to the spindle arms 33, and hence to the wheels W to thus steer the machine. This change in direction of movement will be thus transmitted to all of the vehicles forming the train. When such vehicle train has reached its destination the coupling and steering devices are readily detached therefrom simply by separating the several plates forming the attaching device of the front and rear ends of the coupler bars by loosening or removing several nuts.

I claim:

1. The combination with a pair of vehicles, the rear vehicle having a steering mechanism including spindle arms, a spindle connecting rod, and a yoke on one end of the rod pivotally receiving one of the spindle arms, of a connection between the vehicles, an arm extending from the end of the connection adjacent its attachment with the rear vehicle, a two-part separable yoke, the sections of which are movable apart to receive the first mentioned yoke and the end of the spindle arm pivoted thereto, and a connecting rod pivoted to the arm of the connection and to one of the sections of the separable yoke.

2. The combination with a pair of vehicles, of a connecting member, means for securing the member to the rear end of the front vehicle, and means for securing the member to an axle of the rear vehicle including a rightangular plate having its horizontal arm disposed beneath the axle and the vertical arm engaging the side of the same, said vertical arm having a kerf, an L-shaped plate having its horizontal arm provided with a slot and slidably disposed on the similar arm of the other plate, its vertical arm engaging the side of the axle opposite the same arm of the first mentioned plate, a threaded stud projecting from the horizontal arm of the rightangular plate through the slot in the L-shaped plate, a bolt loosely carried by the vertical arm of said L-shaped plate to be removably disposed in said kerf, a nut on said bolt to draw the vertical arms of the plates into engagement with the axle, and a draw bar fixed to the connecting member of the rightangular plate.

3. The combination with a pair of vehicles, of a connecting member, means for securing the member to the rear end of the front vehicle, and means for securing the member to an axle of the rear vehicle including a rightangular plate having its horizontal arm disposed beneath the axle and the vertical arm engaging the side of the same, an L-shaped plate having its horizontal arm slidable on the similar arm of the rightangular plate and adapted to be adjustably secured thereto, its vertical arm engaging the side of the axle opposite the similar arm of the first mentioned plate, a link connecting the free edges of the vertical arms of the plates and disposed over the top of the axle, a bar fixed to the horizontal arm of the rightangular plate and having its free end secured to the axle for holding said securing means against shifting, a U-shaped yoke secured to said bar below said plates, and a draw bar pivoted within said yoke.

4. The combination with a pair of vehicles, one of said vehicles including a frame bar and a pair of spring clips thereon, said clips being spaced apart and inclined downwardly toward each other, of a connecting member, means for securing one end of the member to one of the vehicles, and means for securing the other end to said frame bar, said means including a draw bar, a plate fixed thereto, and having its opposite ends downwardly inclined toward each other and adapted to engage said spring clips and the adjacent portion of the frame bar, a second plate carried by the draw bar and disposed on the opposite side of the frame bar, and a set bolt carried by the last mentioned plate to engage the frame bar to draw the first mentioned plate theretoward.

5. The combination with a pair of vehicles, one of said vehicles including a frame bar and a pair of spring clips thereon, of a connecting member, means for securing one end of the member to one of the vehicles, and means for securing the other end to said frame bar, said means including a draw bar, a plate fixed to a flanged plate carried by the draw bar and disposed on the opposite side of the frame bar from the first mentioned plate, and a set bolt extending through a flange of said flanged plate for engagement with the frame bar to draw the first mentioned plate theretoward.

In testimony that I claim the foregoing I have hereunto set my hand at Wausau, in the county of Marathon and State of Wisconsin.

THOMAS H. JACOB.